(12) United States Patent
Eriksson et al.

(10) Patent No.: US 9,787,796 B2
(45) Date of Patent: Oct. 10, 2017

(54) PROVIDING INFORMATION TO A CORE NETWORK RELATING TO A CACHE IN AN ACCESS NETWORK

(71) Applicant: Telefonaktiebolaget LM Ericsson (publ), Stockholm (SE)

(72) Inventors: Hans Eriksson, Sollentuna (SE); Lars Westberg, Enköping (SE)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 0 days.

(21) Appl. No.: 15/141,480

(22) Filed: Apr. 28, 2016

(65) Prior Publication Data

US 2016/0248878 A1    Aug. 25, 2016

Related U.S. Application Data

(62) Division of application No. 14/111,140, filed as application No. PCT/EP2012/056667 on Apr. 12, 2012, now Pat. No. 9,357,581.

(Continued)

(51) Int. Cl.
*H04L 29/08* (2006.01)
*H04L 29/06* (2006.01)
(Continued)

(52) U.S. Cl.
CPC ...... *H04L 67/2857* (2013.01); *H04L 12/4633* (2013.01); *H04L 29/08729* (2013.01); *H04L 41/5029* (2013.01); *H04L 63/306* (2013.01); *H04L 67/2871* (2013.01); *H04M 15/66* (2013.01); *H04W 4/18* (2013.01); *H04W 12/02* (2013.01); *H04W 24/10* (2013.01); *H04W 76/041* (2013.01); *H04L 69/22* (2013.01);

(Continued)

(58) Field of Classification Search
CPC .......................... H04W 76/041; H04W 12/02
See application file for complete search history.

(56) References Cited

U.S. PATENT DOCUMENTS

| 2010/0034089 A1 | 2/2010 | Kovvall et al. |
| 2010/0080127 A1* | 4/2010 | Yin ........................ H04L 47/11 370/235 |

(Continued)

FOREIGN PATENT DOCUMENTS

| CN | 101026631 A | 8/2007 |
| WO | WO 2011/011458 A2 | 1/2011 |

OTHER PUBLICATIONS

Second Office Action for Chinese Patent Application No. 201280017864.3 dated Feb. 22, 2017, 22 pages including English translation.

(Continued)

*Primary Examiner* — Jae Y Lee
(74) *Attorney, Agent, or Firm* — Sage Patent Group

(57) ABSTRACT

Methods and apparatus for a providing information to a core network where a terminal exchanges data with a cache in an access network. The node stores data in the cache. Data is exchanged between the cache and the terminal, and information relating to the exchanged data is provided to the core network. This allows the core network to apply normal core network functions such as LI, charging and policy control, even when the data does not pass through the core network.

24 Claims, 8 Drawing Sheets

Related U.S. Application Data

(60) Provisional application No. 61/474,447, filed on Apr. 12, 2011, provisional application No. 61/562,030, filed on Nov. 21, 2011.

(51) Int. Cl.
| | | |
|---|---|---|
| *H04W 12/02* | (2009.01) | |
| *H04W 4/18* | (2009.01) | |
| *H04L 12/24* | (2006.01) | |
| *H04M 15/00* | (2006.01) | |
| *H04W 76/04* | (2009.01) | |
| *H04L 12/46* | (2006.01) | |
| *H04W 24/10* | (2009.01) | |
| *H04W 76/02* | (2009.01) | |
| *H04W 88/16* | (2009.01) | |
| *H04W 84/04* | (2009.01) | |

(52) U.S. Cl.
CPC ........ *H04W 76/022* (2013.01); *H04W 84/042* (2013.01); *H04W 88/16* (2013.01)

(56) References Cited

U.S. PATENT DOCUMENTS

| | | |
|---|---|---|
| 2010/0085978 A1 | 4/2010 | Ramankutty et al. |
| 2010/0232353 A1 | 9/2010 | Hu et al. |
| 2011/0075675 A1* | 3/2011 | Koodli ............... H04L 12/14 370/401 |
| 2011/0170411 A1* | 7/2011 | Wang ............... H04W 76/02 370/235 |
| 2011/0280153 A1 | 11/2011 | Li et al. |

OTHER PUBLICATIONS

International Search Report and Written Opinion of the International Searching Authority, PCT Application No. PCT/EP2012/056667, Jul. 19, 2012.

3GPP, Technical Specification: $3^{rd}$ Generation Partnership Project; Technical Specification Group Services and System Aspects; General Packet Radio Service (GPRS) enhancements for Evolved Universal Terrestrial Radio Access Network (E-UTRAN) access (Release 10), 3GPP TS 23.401 V10.2.1 (Nov. 2011), 276 pp.

International Preliminary Report on Patentability, PCT Application No. PCT/EP2012/056667, Nov. 8, 2013.

* cited by examiner

PROVIDING INFORMATION TO A CORE NETWORK RELATING TO A CACHE IN AN ACCESS NETWORK

CROSS REFERENCE TO RELATED APPLICATIONS

This application is a divisional of U.S. patent application Ser. No. 14/111,140, filed 17 Jan. 2014, which itself is a 35 U.S.C. §371 national stage application of PCT International Application No. PCT/EP2012/056667, filed on 12 Apr. 2012, which itself claims priority to U.S. Provisional Patent Application No. 61/474,447, filed 12 Apr. 2011 and U.S. Provisional Patent Application No. 61/562,030, filed 21 Nov. 2011, the disclosure and content of all of which are incorporated by reference herein in their entirety. The above-referenced PCT International Application was published in the English language as International Publication No. WO 2012/140135 A1 on 18 Oct. 2012.

TECHNICAL FIELD

The invention relates to the field of providing information to a core network where a terminal exchanges data with a cache in an access network.

BACKGROUND

It is known to provide caching in a mobile network. Caching is based on the idea that a large percentage of Internet traffic is repetitive, and that eliminating the sending of repeating content from its origin may offer a savings opportunity in terms of required bandwidth. The main principle of caching in a mobile network is that copies of the repeated content in, for example, the Internet, are moved closer to mobile users. For example, such content may be cached in different parts of the Radio Access Network (RAN), in the Core Network (CN), or just "above" the CN.

The main benefits that can be achieved with caching in mobile networks are as follows:
a. A decrease in the cost of transport in the mobile network as well as the cost for Internet peering. This is achieved "above the cache", as the cached information in principle is only transferred once in the transmission links above the cache.
b. An improved quality of experience for the mobile end-users. This is mainly achieved with lower delays, as the cached information can be returned faster to the mobile users from the cache (compared to the case where the information is obtained all the way from the original location).
c. Provision of new services, such as content hosting and storage/backup for the operators. A mobile operator can agree with content providers to ensure that the content from a specific content provider is delivered in a better way to the mobile users in the mobile operator's network.

While the cache can be implemented in various ways in a mobile communication network, there are no satisfactory solutions for interworking between the core network and the cache. For example, there are issues with Lawful interception (LI), charging and policy control. It is therefore difficult to locate a cache (proxy) in a radio network access (Radio base station (RBS), radio network controller (RNC) or similar aggregation point in the backhaul topology below the mobile packet core network nodes such as SGSN, S-GW, PDN-GW/GGSN). The term RNCC (Radio Network- and Cache Controller) is used herein as a generic term that encompasses a current RNC as defined in 3GPP, a future radio access network aggregation and cache control point for 2G, 3G, 4G (LTE), and possible future radio access technologies.

One of the main problems with caching below the core network is that functions such as Lawful Intercept, policy- and charging control are executed in the core network. With a caching solution where user plane traffic is fetched from a cache below the core network, there is currently no solution of how to enforce policy control of the cache, and how to make LI and charging of a subscriber that accesses content that is stored in the cache.

The problem is illustrated in FIG. 1, in which a terminal 1 such as User Equipment (UE) accesses data stored in a cache 2 located at an RNCC 3. The cache 2 comprises a traffic intercept function 4, cache logic 5 and cache storage 6 for storing the cached data. Data is sent from the cache storage 6 to the terminal 1 without traversing the S/P-GW 7. The data is sent between the cache 2 and the terminal 1 via a Radio Base Station (RBS) 8.

LI is a legal requirement enforced on the operators by legal agencies (LEAs, regulatory or administrative agencies), and intelligence services, in accordance with local country laws. A requirement on the mobile packet network system is to be able to copy all packets that the UE 1 receives and transmits to an external system, without any possible way to detect that the traffic is intercepted. Furthermore, all control-events such as handover are reported to the LI-system.

It is a requirement that LI is made per end-user. It is therefore controlled and identified by IMSI, MSISDN. However, the RAN does not usually have knowledge of IMSI, MSISDN.

LI also requires passive copying of all packets sent to or from the UE to the LI system. All user plane data is seen by Core Network Gateways (e.g. SGSN, GGSN) and the gateway's traffic intercept function sends the user plane data to the LI-system. However, the core network (at which the gateways are located) does not see traffic from the RAN cache.

Reporting of control-plane events is also a requirement for LI, such as handovers and establishment of RABs. However, a cache does not produce any important control-events so it should not be anything specific to report for LI.

LI is configured by an Operation and Maintenance system (OAM) and interfaces with nodes such as the SGSN, S-GW and P-GW/GGSN. However, the LI control signalling such as activate LI for a user can not be sent forward from core network nodes. The RAN does not have knowledge about user identities.

LI should not be traceable by the end-user. No changes are allowed in the perceived network characteristics due to LI. Disconnecting or modifying operations for the cache due to LI is not a feasible solution because a different performance could be measured by the end-user.

The above problems all arise for LI when interworking with a cache in a mobile communication network.

Further problems with interworking with the cache arise from charging requirements. Charging is made per end-user, and therefore controlled by the IMSI and the MSISDN. However, the RAN system does not have knowledge of the IMSI and the MSISDN Volume counting is made separately in the uplink and downlink, and so subscribers' traffic volume is counted in the core network (SGSN, S-GW, P-GW). Traffic between the cache and a UE 1 does not traverse any of these nodes and so will not be counted.

For roaming charging, accounting records are exchanged between operators at roaming, the volumes are counted in the uplink and downlink separately and used for billing. The accounting between the operators is different from subscriber charging. This is a separate charging problem that has to be addressed. Volume charging for end-users is made as a sum for uplink/downlink. On-line charging is typically used for pre-paid services with a maximum traffic quota (buckets). When the end-user has reached maximum traffic limit, the cache should stop or throttle the traffic from the cache to the subscriber. Off-line charging is mainly to support billing on Charging Data Records (CDRs) which are generated by the S-GW/PDN-GW/GGSN. The off-line charging works by counting user plane traffic volume which is stored in the subscriber's monthly traffic bucket. Service based charging is made per-URL and/or IP-address range.

If the operator applies Service based charging, an additional compensation of the subscribers "traffic quota" may be needed. In one scenario, an end-user has a subscription to the content provider who pays for the end-users access of the content.

It can be seen that there are issues in capturing the relevant data for both LI and charging when using a cache at the RNCC 3, as the data from the cache typically does not traverse any nodes that normally have interfaces for such functions.

SUMMARY

It is an object of the invention to allow user plane traffic to provide solutions for interworking functions that are handled by the core network, such as LI, charging and policy control, when a cache is located in an access network. According to a first aspect, there is provided a method of providing information to a core network where a terminal exchanges data with a cache located in a node in an access network. The node stores data in the cache. Data is exchanged between the cache and the terminal, and information relating to the exchanged data is provided to the core network. This allows the core network to apply normal core network functions such as LI, charging and policy control, even when the data does not pass through the core network.

As an option, the method includes establishing a first user-plane tunnel between the cache and the terminal and establishing a second user-plane tunnel between the cache and the core network. The second user plane tunnel is provided for sending the information relating to the exchanged data. The information optionally includes any of a URL for service based charging, a report on volume of data sent in the first user plane tunnel for volume based charging, required Quality of Service information, and a copy of all packets sent in the first user plane tunnel via any of the second user plane tunnel and a further user plane tunnel. As a further option, the method includes determining the type of information reported using either the second user plane tunnel or the further user plane tunnel by any of sending a ping message to a host and detecting a modified DSCP on a response to the message, wherein no response indicates that caching should not be allowed for the terminal, or sending a ping to a predetermined plurality of destinations and using the received responses to select a type of information to report, or determining a type of information to report using a value in a Subscriber Profile ID.

In order to allow the core network to distinguish upload and download data sent between the cache and the terminal, the method optionally includes establishing a first set of data comprising data sent from the terminal to the cache and establishing a second set of data comprising sent from the cache to the terminal. The first and second data sets are sent towards the core network using the second user plane tunnel. In order to further assist in differentiating upload and download traffic at the core network, the first set of data is optionally sent to a first address and the second set of data to a second address. The core network then establishes virtual hosts to receive these and treats the data sets differently depending on whether they were sent to the first or the second address.

An alternative way to provide information to the core network is to provide, at the node, any of a Lawful Intercept interface for sending and receiving information relating to data sent between the terminal and the cache towards a lawful intercept node, and a charging/policy interface for sending and receiving charging/policy information relating to data sent between the terminal and the cache towards a charging/policy function in the core network. In this way, the required information is sent directly to the relevant nodes in the core network.

As an option, the method comprises, at the node, receiving a first request for data at the cache. A cache miss is generated such that the data cannot be retrieved from the cache. A reply from the core network is intercepted. On the basis of the intercepted reply, a policy for applying to future requests for the data at the cache is deduced.

As a further option, the method comprises, at the node, receiving a request from the terminal for data at the cache. A determination is made as to whether the terminal has received more than a predetermined amount of data from the cache and, if so, a cache miss is generated such that the data cannot be retrieved from the cache. In this case, the predetermined amount of data is optionally selected from a total amount of allowable data and an allowable amount of allowable data within a predetermined time period.

As an option, the method comprises, at the node, receiving a request from a terminal for data at the cache. A determination is made as to whether the requested data is of a predetermined type of data. If so, a cache miss is generated, which prevents the terminal from retrieving data from the cache.

Optionally, the method comprises, prior to exchanging data between the cache and the terminal, determining whether the terminal is roaming in a network other than the home network of a subscriber associated with the terminal. If the terminal is not roaming then the exchange of data is allowed between the terminal and the cache, but if the terminal is roaming then the exchange of data between the cache and the terminal is not allowed. In this cases, the determination of whether the terminal is roaming in a network other than the home network of a subscriber associated with the terminal is optionally made using any of analysing a Time to Live field in a ping message sent between the access network and the home network and identifying a Public Land Mobile Network identifier within an International Mobile Subscriber Identity of a subscriber associated with the terminal.

According to a second aspect, there is provide an access network node that is provided with a cache arranged to store data, an interface arranged to allow the exchange of data between the cache and the terminal, and a further interface for providing information relating to the exchanged data to a core network.

As an option, the access network node is provided with a processor for establishing a first user-plane tunnel between the cache and the terminal. The processor is arranged to establish a second user-plane tunnel between the cache and the core network, wherein the second user plane tunnel is provided for sending the information relating to the exchanged data. As a further option, the processor is arranged to use the second user plane tunnel to report any of a URL for service based charging, a report on volume of data sent in the first user plane tunnel for volume based charging, and a copy of all packets sent in the first user plane tunnel.

As an option, the processor is arranged to establish a first set of data comprising data sent from the terminal to the cache and a second set of data comprising sent from the cache to the terminal. The processor is arranged to send the first set of data and the second set of data towards the core network using the second user plane tunnel. This allows the core network to differentiate upload and download data sent between the cache and the terminal.

In an alternative optional embodiment, the access network node is provide with any of a Lawful Intercept interface for sending information relating to data sent between the terminal and the cache towards a lawful intercept node in the core network, and a charging/policy interface for sending charging/policy information relating to data sent between the terminal and the cache towards a charging/policy function in the core network.

According to a third aspect, there is provided a core network node that is provided with a first receiver for receiving from an access network via a user plane tunnel a first set of data sent to a first host address, the first set of data comprising data sent from a terminal to a cache in the access network. A second receiver is provided for receiving a second set of data sent to a second host address, the second set of data comprising data sent from the cache to the terminal. A processor is provided for applying a different rule to handling the first set of data to the second set of data. This allows the core network node to differentiate upload and download data sent between the cache and the terminal.

According to a fourth aspect, there is provided a computer program, comprising computer readable code which, when run on a node, causes the node to perform the method as described above in the first aspect.

According to a fifth aspect, there is provided a computer program product comprising a computer readable medium and a computer program as described above in the fourth aspect, wherein the computer program is stored on the computer readable medium.

DETAILED DESCRIPTION

In order to address the problem of interworking between the cache and the core network (CN), mechanisms are provided that allow the cache or an associated node in the access network to send information related to data exchanged between the cache and a terminal to a relevant node in the core network. This allows, for example, LI functions to be provided even where the terminal receives data from the cache located in the access network rather than via the core network.

Figure 1:
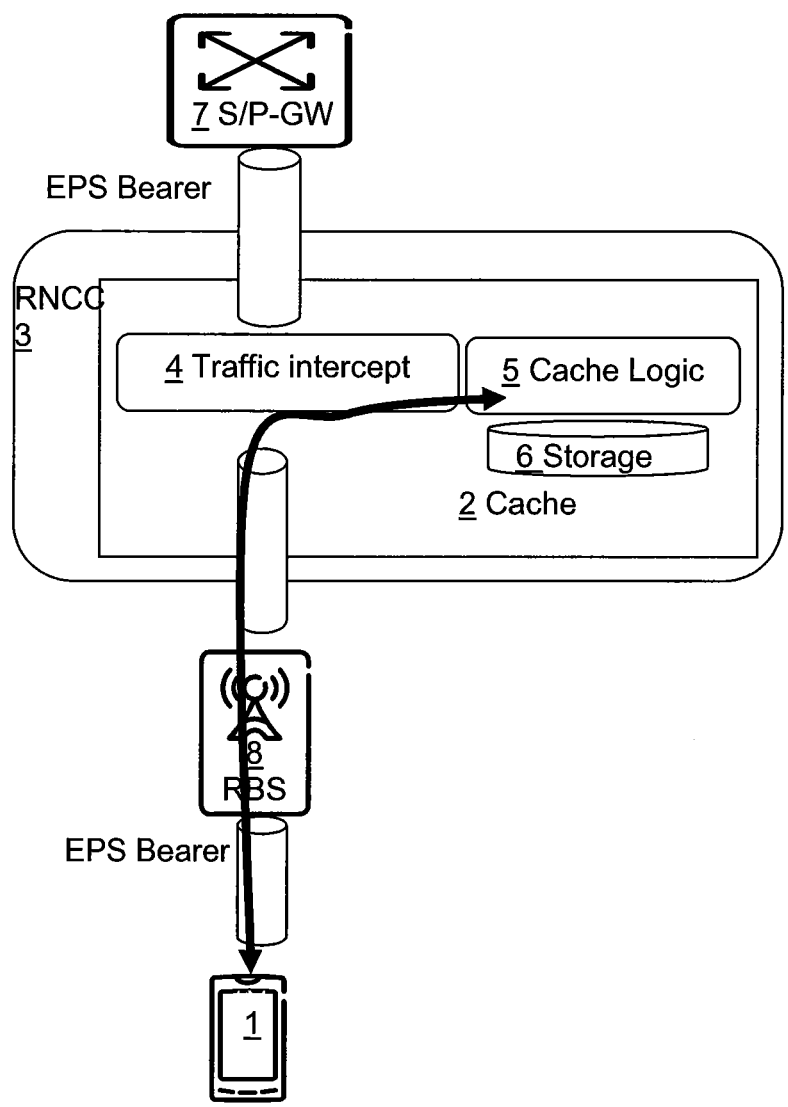
FIG. 1 illustrates schematically in a block diagram a network architecture and problem with using a cache.
Figure 2:
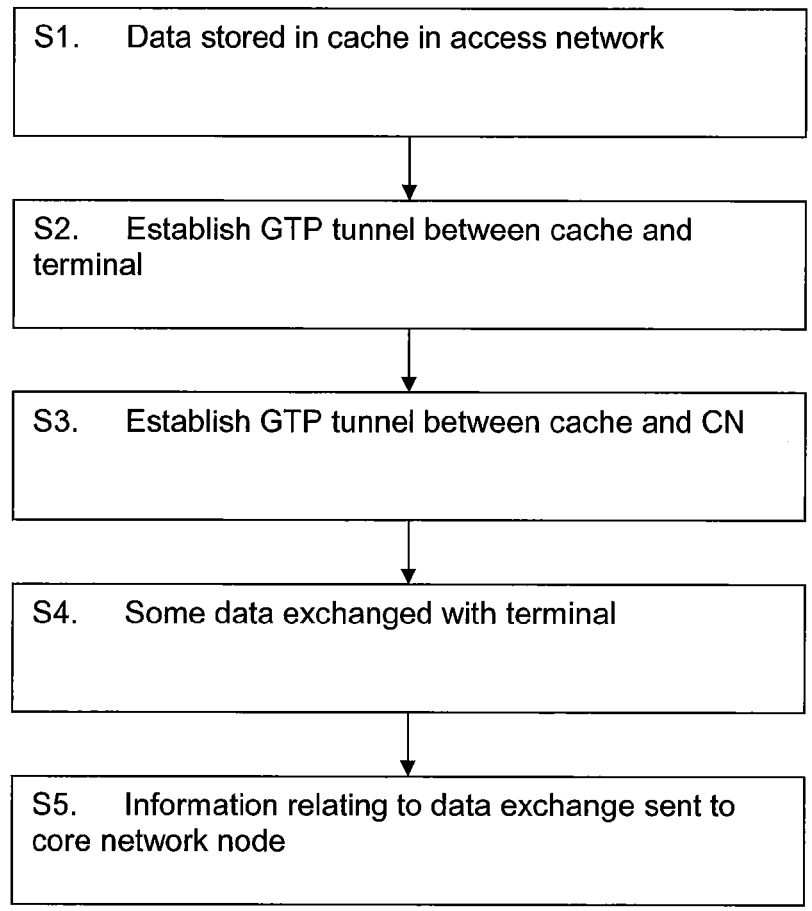
FIG. 2 is a flow chart showing embodiments.

FIG. 2 illustrates the basic steps. The following numbering corresponds to that of FIG. 2:
  S1. Data is stored at a cache located in the access network.
  S2. In an optional embodiment, a GTP user plane tunnel is established between the cache and the terminal;
  S3. In an optional embodiment, a GTP user plane tunnel is established between the cache and the CN;
  S4. Data is exchanged between the cache and a terminal.
  S5. Information relating to the data exchange is sent to the CN, either via the tunnels established in steps S3 and S4, or via a direct interface between a node in the access network and the CN.

There are three main solutions identified how to provide interworking between the cache in the access network and the functions handled by the CN, such as Lawful intercept (LI), charging and policy control, when introducing a cache (proxy) below the CN:
  A. Off-line charging and LI interface in an access node such as a Radio Network- and Cache Controller (RNCC) and on-line charging in core-network;
  B. No LI and charging/policy interfaces in RNCC; implicit by adding reporting to CN; and
  C. No LI and charging/policy interfaces nor reporting to CN (i.e. do nothing)

The first embodiment, (Solution A above), includes providing an off-line charging and LI interface at the RNCC and on-line charging in core-network. This embodiment is based on S-GW reports of Charging Data Records (S-CDR) reporting for "Off-line" charging data records sent from the RNCC 3 to the off-line-charging-system (OCH) in the same way as 3GPP describes the reporting from Serving-GW to OCH. An additional LI interface is added to the RNCC node. The on-line charging is done by the CN without any changes or impacts.

This embodiment requires that an off-line charging interface is added to the RNCC 3 for generation of charging records S-CDR (defined in 3GPP).

The transfer of user identities (Mobile Subscriber ISDN Number, MSISDN, and International Mobile Subscriber Identity, IMSI) and charging characteristics from the CN is achieved by updating Radio Access Network Application Part (RANAP), a control protocol in the Iu-interface, and S1AP (a 3GPP defined S1 User Plane)). Charging characteristics is a parameter that determines how the charging should be done (offline, online etc).

Updates can be done using vendor-specific options or modifications of the 3GPP standard.

The first embodiment has no impact on the Packet Core System except that it requires updates of the control plane above. However, an LI interface has to be added to the RNCC node. The core RAN interface solution can be a vendor specific, or be standardized for a multi-vendor environment.

Figure 3:
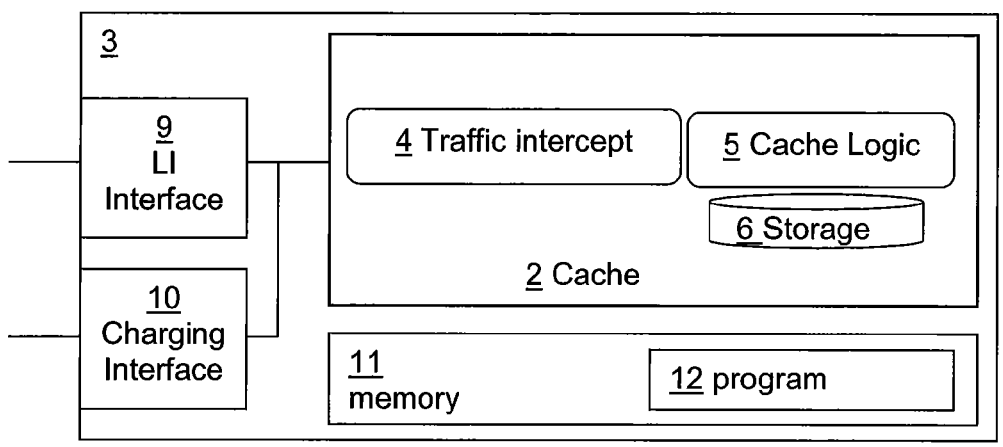
FIG. 3 illustrates schematically in a block diagram a Radio Access Network node according to a first embodiment.

The first embodiment moves LI/charging/policy complexity to the RAN/RNCC. Charging currently utilizes both router and Gateway GPRS Support Node (GGSN) functions to provide charging schemes. Most of these functions are built into the GGSN-node and are not visible to the external interfaces. A multi-vendor solution requires standardization. A distributed LI-function may be more difficult to configure and coordinate than a centralized LI-function FIG. 3 illustrates an Access Network node such as an RNCC 3, which is provided with a cache 2 for storing data 6, at least one of a Lawful Intercept interface 9 for sending information relating to data sent between the terminal 1 and the cache 2 towards a lawful intercept node, and a charging/policy control interface 10 for sending charging/policy control information relating to data sent between the terminal 1 and the cache 2 towards a charging/policy control function in the CN. A computer readable medium in the form of a memory 11 may also be provided, which can be used to store a computer program 12 which, when executed by a processor, causes the RNCC 3 to behave as described above.

The RNNC 3 could be one of many types of node in which this functionality can be implemented along with a cache. These include, but are not limited to, a Radio Base Station (RBS), a Radio Network Controller (RNC), a Base Station Controller (BSC), a Broadband Remote Access Server (BRAS), a Residential Gateway (RGW), a Border Network Gateway (BNG) and a Packet Data Serving Node (PDSN).

A second embodiment (solution B above) does not provide an LI or charging interface at the RNCC 3; but instead relies on reporting to the CN. This is based on re-use of existing CN functions but adding an in-band reporting in a GPRS Tunnelling Protocol (GTP) user-plane tunnel used to transport user plane data. This enables the CN to detect the cache actions and re-uses already available functionality for charging/policy and LI in the CN.

Figure 4:
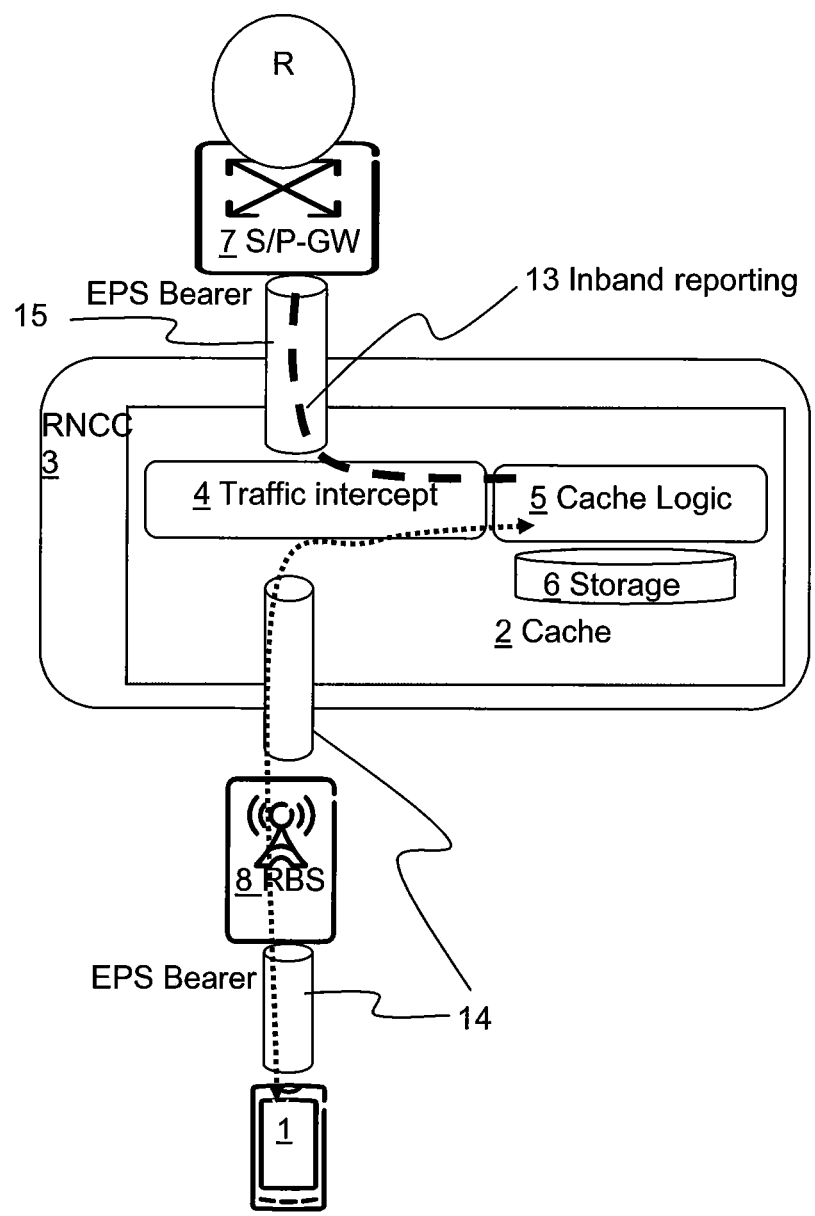
FIG. 4 illustrates schematically in a block diagram a network architecture and signal flow according to a second embodiment.

Turning to FIG. 4, it is shown that in-band reporting 13 from the cache 2 towards the CN is provided by the RNCC 3. In other words, a GTP user-plane tunnel 14 is established between the cache 2 and the terminal 1 as shown in FIG. 2 step S3, a further GTP tunnel 15 is established between the cache 2 and the CN (in this example, the CN node shown is a S/P-GW 7), which sends the same information, as shown in FIG. 2 step S4. As the CN node has existing functionality for interworking with LI and charging functions, it can report LI and charging data without requiring any additional functionality.

This solution has no impact on the CN, and can be deployed without standardization. It supports off-line charging/service based charging. Caching for on-line charging may be done, but the time to act when Out-of-Quota is detected for a subscriber will take a bit longer time if the gate control for online charging is done at the RNCC 3. It is possible to standardize selecting cache reporting options.

Figure 5:
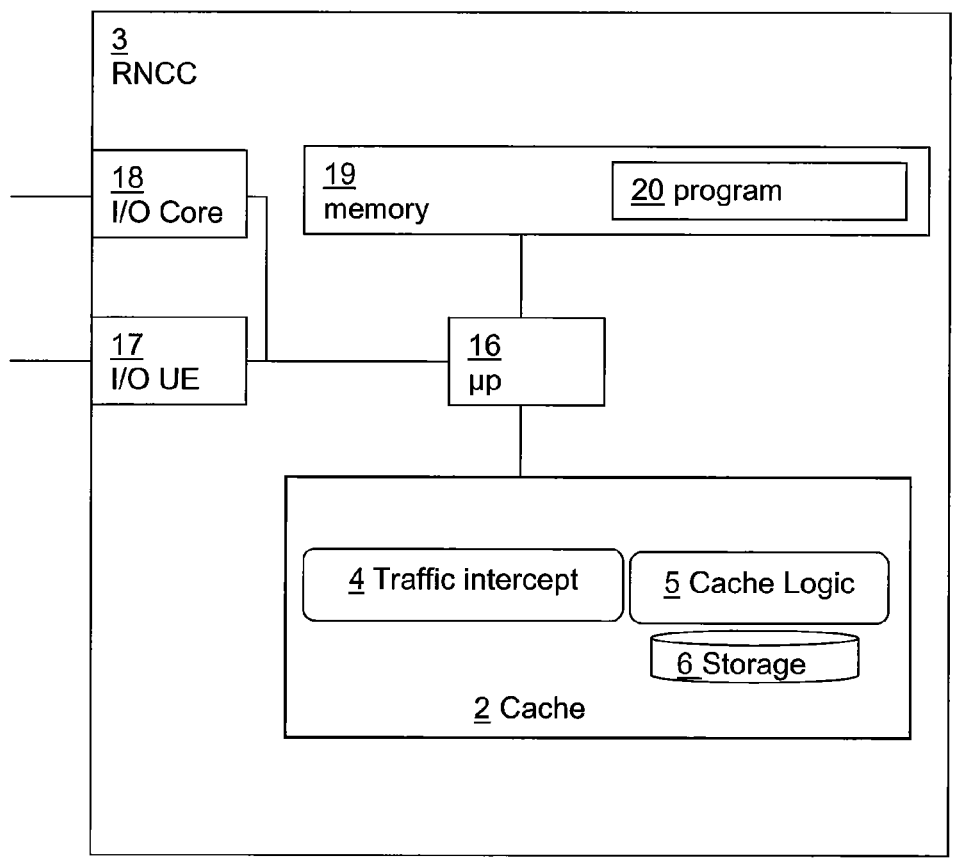
FIG. 5 illustrates schematically in a block diagram a Radio Access Network node according to the second embodiment.

FIG. 5 shows an RNCC 3 according to the second embodiment. The RNCC is provided with a cache 2 for providing data to the terminal 1, along with a processor 16 that controls the sending of data. The processor 16 is used in establishing a GTP user-plane tunnel 14 between the cache 2 and the terminal 1 via an interface 17, and in establishing a GTP user-plane tunnel 15 between the cache 2 and the CN via an interface 18. A computer readable medium in the form of a memory 19 may be used to store a computer program 20 which, when executed by the processor, causes the RNCC 3 to behave as described above.

As with the first embodiment, the RNNC 3 could be one of many types of node in which this functionality can be implemented along with a cache. These include, but are not limited to, a Radio Base Station (RBS), a Radio Network Controller (RNC), a Base Station Controller (BSC), a Broadband Remote Access Server (BRAS), a Residential Gateway (RGW), a Broadband Network Gateway (BNG) and a Packet Data Serving Node (PDSN).

The reporting of events in the cache 2 is sent in-band in the GTP-tunnel 15 to the core-network, which passes LI/Charging functions to the CN. This enables the CN to see both uplink and downlink between client and cache. For LI, the GTP tunnel 14 between terminal 1 and the cache 2 is mirrored in the GTP tunnel between the cache 2 and the CN, and is seen by the CN in the reverse direction. This may need to be taken into account by the LI system. The reporting in the cache 2 is associated with a GTP tunnel, which in the CN is associated with a specific end-user identity. There is no need for knowledge of the user identity at the RNCC 3.

Figure 6:
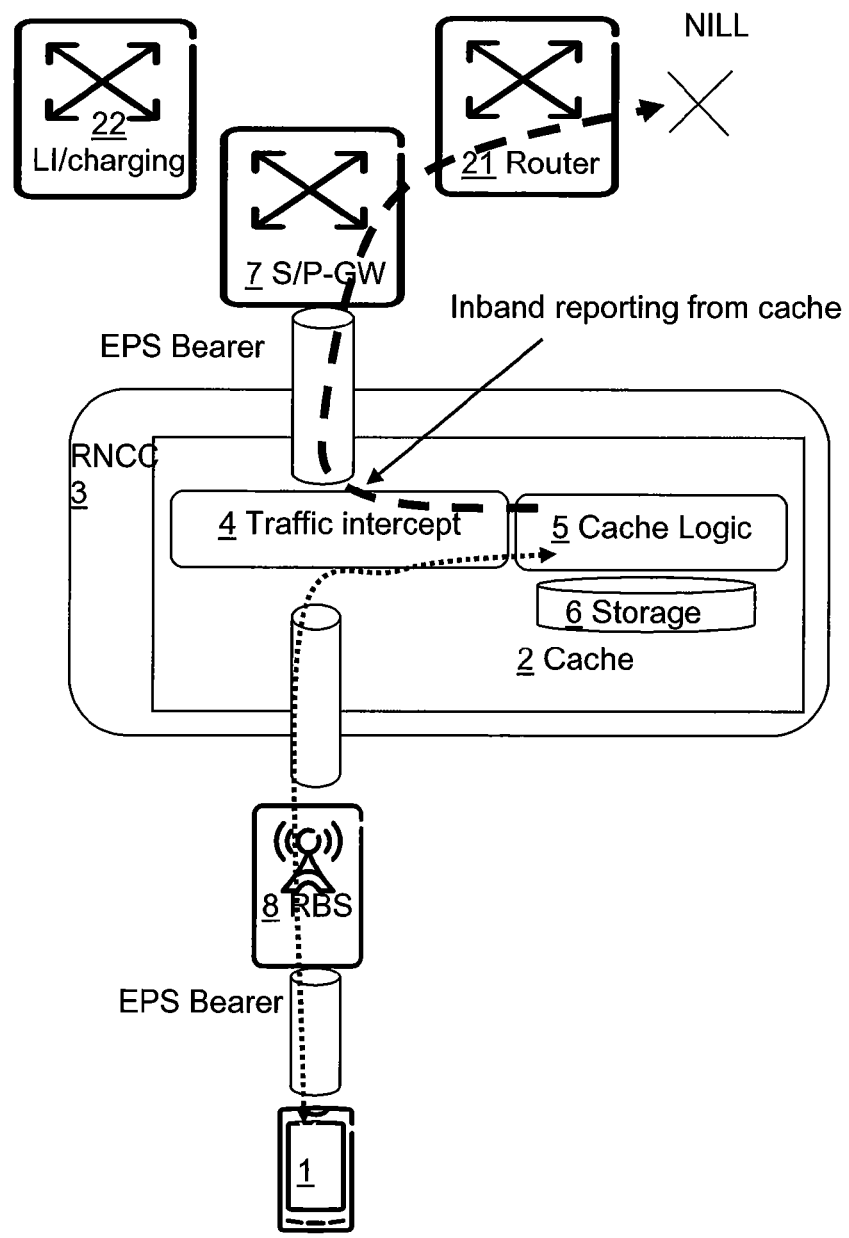
FIG. 6 illustrates schematically in a block diagram a network architecture and signal flow according to a second embodiment of the invention with in-band reporting from the cache.

"In-band reporting" traffic may be terminated at a router or P-GW (GGSN) and silently discarded by using existing packet filtering. Reporting packets can be identified by a specific DSCP (and/or IP-address). Alternatively, in-band reporting traffic may be sent to a separate management/test system, to a specifically configured IP-host. In-band reporting is illustrated in FIG. 6 in which a router 21 and a LI/charging function 22 are also illustrated.

Reporting options may be identified by analyzing different LI/charging options.

Volume charging for an end-user is a sum of both uplink and downlink transferred volume. The requirement is simply to generate uplink reporting traffic such that the sum of uplink and downlink counters is correct. Caching for roaming users may not be supported of two reasons:

1. The charging agreement between operators makes it difficult to perform caching for uplink/downlink accounting.
2. The home network may not have any functionally for cache reporting.

For on-line charging, implicit detection is done in the cache system when the CN activates "gating" functions (throttling or stop of flows) due to "Out-of-quota" for a subscription. The detection that "gating" is applied in the CN is done by counting failed downloads through the CN for a specific flow.

Alternatively, vendor-specific options in 3GPP may allow the design of a new in-band reporting GTP-protocol that adjusts the volume counters in GGSN/P-GW based on vendor specific options and generates specific control events such as "no cache" at "out-of-quota" for on-line charging. Alternatively, a new in-band protocol standard may be provided for multi-vendor operations.

Service based charging is based on reporting of URLs at cache-hit. If an operator uses packet filters it may require that they are sent to the correct destination. The reporting packets should then have a Differentiated Services Code Point (DSCP). Otherwise the reporting can be sent to any IP-destination.

For Lawful intercept, all packets are mirrored into the GTP tunnel up to the CN, for all packets that has been exchanged between end-users terminal and the cache. As end user must not know, and the cache does not know, that the communication is subject to LI, the cache 2 only acts on the request to copy all traffic that is received between the UE 1 and the cache 2 for the specific GTP tunnel (TEID) identifier. The cache control only acts according the cache reporting options without knowledge of LI.

Based on the analysis above there are only a few reporting alternatives required:
1. No caching.
2. Caching without reporting.
3. Reporting of URLs (service based charging). A variant of service based charging where the reporting packet sent in uplink is directed to specific URL that for the CN is translated to a specific service based charging used for volume counting. E.g. a URL that translates to that the user's volume can be increased with n number of MB. This solution reduces the bandwidth requirements in the uplink for the volume charging reporting described in option 4 below.
4. Reporting on volumes (Volume based charging): inject packets in GTP tunnel uplink for volume counter adjustments in Core. The user plane packet are copied both up- and downlink between the cache and UE, alternative the cache reported up-link packets are only dummy packets generated so that sum of up and downlink is correct (volume based charging). Alternative solutions include vendor specific RAN/Core or a multi-vendor standard with same signalling as above.
5. Copy of all packets in down and up link (mirroring all user traffic) which is sent between cache and UE (used for LI-support and testing).

To control what type of reporting (inband mirroring of data, URL reporting etc) that the cache should send to CN, a new control signalling is required. There are several alternatives as follows:
1. Send a "ping" at bearer set-up to a specific destination IP-address and detect modified DSCP on the response. The ping could be sent to a host in a router or a host in the RNCC.
2. Send a ping to a specific set of destinations and then use the detection of received ping to select reporting option. The configuration can be done per terminal and by an off-the-shelf Policy control and Charging Rule Function (PCRF).
3. Alternative usage: Subscriber Profile ID, SPID (5 codes)
4. Vendor specific options in RANAP and S1AP
5. A new standardized interface for multi-vendor solution defined over, for example, RANAP and S1AP.

For alternative 1, commodity router functions in core-network are used, such as DSCP-remarking, packet filtering together with address-filtering. The re-marking is only applied for a group of Source/Destination IP-address.

The destination IP-address is used to limit the addressing scope to reporting control. Source address filtering in combination with DSCP-remarking is used to select the reporting option per UE. If no response then option 1 with no caching is used. The CN may not be prepared for caching and therefore it is better to wait to activate the cache. Filtering and remarking is configured by OAM.

For alternative 2, commodity packet filtering and PCRF-based control is used together with address-filtering in the Router/GGSN. For each cache reporting option, a new Quality of Service (QoS) profile is defined. For each subscription (possibly also in combination with terminal type) a QoS profile is configured for the default bearer using existing mechanisms for the policy control system (PCRF), see also example script below. By using alternative 2, the default traffic profile received from a Home Location Register, HLR (in initial attach and at default bearer activation) is replaced by this new QoS profile (understood as the cache report option in the RNCC) for the GTP tunnel (EPS bearer).

In order to map a QoS profile to a reporting alternative, the cache control system sends a "ping" message to a dedicated set of predefined Host instances, one for each code (value or code bit). The combination (sum or merge) of all received and not received ping messages is used to calculate a "cache report option" value. The filter rules that are defined per user with the QoS profiles are part of the normal so-called Policy and Charging Control (PCC) rules used for all the bearers, including the default one. Each PCC rule has also a filter rule settings that is enforced on the router/GW's (GGSN, P- and S-GW); i.e. the output of a PCRF is the QoS profile number that the GW/Router needs to apply. The PCRF determines this profile based on the user identity and the type of service/traffic. The output will be, for example, "please apply QoS profile #n to this flow", and then the GW/Router will apply the requested QoS profile.

Depending on the filtering rules, the GW will allow or discard a ping request for the dedicated "Ping Hosts". The cache control system will detect "ping reply" from some hosts and "loss of ping replies" from other hosts. The conclusion from the ping and no ping answer is then used to calculate the "Cache report option" value to be used by the cache control for this specific GTP tunnel (EPS bearer).

A number of "ping hosts" are therefore required. Each Host (instances) represents, for example, one binary bit value of the coded reporting alternative. The end-user profile with "cache report options" is mapped to "QoS profiles and filter rules" and configured in PCRF, by an Operation and Maintenance (OaM) system. Cache control functions send a ping to dedicated hosts, and analyse the replies to calculate "Cache reporting option" value. The GW nodes will act on the PCC filter rules as currently known, and allow or discard ping requests. The value of "Cache Report Option" can be, e.g. binary values, but not limited to that as other coding can also be used as a vendor/operator specific solutions.

An example script for PCRF configuration is as follows:

```
content-type <number>
    deferred-charging pattern <name>
    ...
end
    label <label>
    subscriber-type <type>
    effective-time [<seconds>]
    tos {minimize-delay | maximize-throughput \
    | maximize-reliability | minimize-monetary-cost | normal-service}
    drop [reset]
    no-instances
    sibling {<content-type-number> | control-defined}
    ...
end
```

The example script above is similar to RFC 1349 Section 4:
 1000—minimize delay
 0100—maximize throughput
 0010—maximize reliability
 0001—minimize monetary cost
 0000—normal service Alternative 3 uses the SPID, defined in 3GPP. The SPID is configured in a Home Subscriber Server (HSS) and can be set to different values depending on a selected strategy on how cache reporting shall be done per user. The SPID is then detected from the GTP tunnel that passes through the RNCC.

For a roaming subscriber, the accounting records that are exchanged between operators are used to detect roaming. Uplink and downlink volumes are counted separately and used for accounting between the operators. Caching is therefore difficult for roaming subscribers, and an option is simply not to offer it.

A detection of roaming can be done by analyzing a Time to Live (TTL) field in the ping message, assuming that the ping-host is close to the P-GW/GGSN. One approach is to set the TTL value as low as possible such that the ping message is discarded where roaming is detected.

Another way of detecting whether a user in the radio access network (where the cache is located) is a roaming user, is to identify the PLMN-ID within the subscriber's IMSI. The PLMN-ID reveals the home network of the subscriber. The IMSI is accessible to the RNC 3 in 3G systems, and no specific additional procedures would be needed to get hold of the IMSI. In 4G systems (LTE or future systems) with no RNC 3, the cache may be located along the GTP tunnel and the IMSI can be signalled using options defined in 3GPP when the GTP tunnel is established. Using this solution the IMSI can be captured and stored in the RNCC 3. A cache may be used with a GTP tunnel in an LTE network as follows:

It may be desirable to make exceptions to allowing caching during roaming, and that can be done providing a list of allowed PLMNs in the RNCC 3.

The GPRS Tunnelling Protocol (GTP), or really the user plane part of it i.e. the GTP-U protocol, is used on a S1-U interface. Normally, the GTP-tunnel is between an eNodeB (eNB) and the CN. However, the cache 2 is included as part of the S1-U interface between eNB and the CN. The GTP-tunnel that traversed between eNB and CN is divided into two different parts, one part between the eNB and the cache 2, and another part between the cache 2 and the CN. The main benefit with this solution is that it can be introduced with changes only in the RAN. This means that the CN 'sees' the cache 2 as an eNB, and the real eNB is hidden from the CN.

To enable this solution, a new control plane interface S1-RAN is created between the eNB 6 and the Cache 2.

For the establishment of the S1-RAN interface it is assumed beneficial that the eNB establishes the connection towards a RAN Controller and therefore there needs to exist a mechanism for the eNB to select the most suitable RAN Controller (suitable for example because the location of the RAN Controller is very close to the normal transmission path of the S1-U interface).

One solution for S1-RAN interface establishment that avoids unnecessary configuration in each eNB is to apply a Domain Name System (DNS)-based solution. In this case the eNB builds a Fully Qualified Domain Name (FQDN) consisting of (or alternatively including by not limited to) the string "RAN", PLMN identifiers Mobile Network Code (MNC) and Mobile Country Code (MCC), and parts of identifiers for the eNB (e.g. eNB-ID or parts of it), and then performs a DNS query. The returned IP-address is the IP-address of the RAN Controller configured in the DNS. An example of such a FQDN for the MCC and MNC is "RAN.eNB9876.mnc012.mcc345.pub.3gppnetwork.org"

Further details of the S1-RAN interface establishment and the protocol architecture are not described. However, as an example it is suggested that this interface may be SCTP based as this is used e.g. for S1-MME in the eNB.

In some circumstances, it is advantageous to mirror terminal traffic into the GTP tunnel sent upwards to CN to allow the CN to know whether data traffic is an uplink or a downlink between the terminal 1 and the cache 2. In the CN the traffic in the GTP tunnel can be handled in a normal way without any impact to the CN GW (e.g. GGSN). Inside the GTP tunnel the mirrored uplink and downlink is separated, for example in order to allow for different charging for uplink and downlink, and also to have an accurate report to the LI system if content is coming form RAN cache, terminal, or the Internet.

Figure 7:
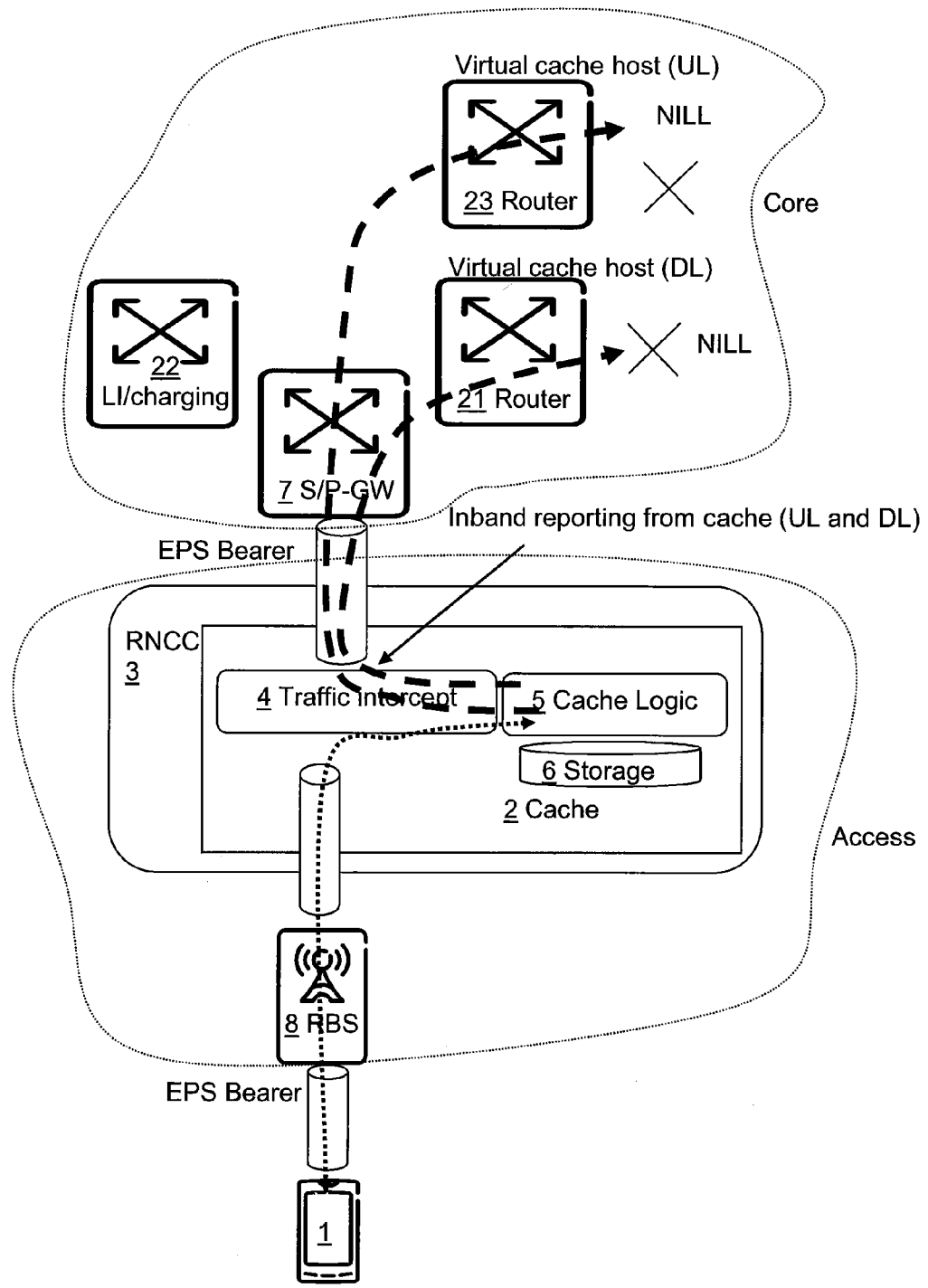
FIG. 7 illustrates schematically in a block diagram a proposed network architecture and signal flow with in-band reporting having uplink and downlink traffic separated.

Such an arrangement is illustrated schematically in FIG. 7. As shown in FIG. 7, reporting of events in the cache 2 for charging and Lawful Intercept purposes is sent in-band in the uplink GTP tunnel to the CN; a router 21, 23 and a LI/charging function 22 are also illustrated.

The in-band signalling is sent in the uplink direction inside GTP-tunnel from the cache 2 to the CN. Reporting is sent to a specific configured IP host, one for the terminal's uplink and another for the terminal's downlink. The uplink in-band signalling in the GTP tunnel passes LI/Charging capture functions inside the CN GW 7. The CN GW 7 is able to use standard signalling to communicate with the LI/charging function 22. This enables the CN to see both uplink and downlink between client and cache, in the same way as normal traffic. The reporting in the cache 2 is associated with a GTP tunnel, which in the CN is associated to the specific end-user identity.

The RNCC 3 mirrors both uplink and downlink IP packages from the cache 2 (for a specific terminal 1) towards the CN gateway 7). The access control function (normal IP routing function) in the CN has an IP address spoofing function that checks that source IP address is valid, i.e. known by the CN.

To keep the IP packet consistent a virtual terminal host is configured in the Cache Logic 5, which copies the original terminal source IP address into the generated mirrored packets Source IP address field.

The destination IP address is set to the address that represents the "Virtual cache host for reporting". The mirrored packets may be discarded after passing the point where the GW 7 replicates the packets to the LI and charging system.

The UL and DL is separated and two destination IP addresses are configured, one for the uplink and one for the downlink. This solution makes it possible to differentiate how to charge for traffic uploading content from terminal to cache vs. downloading content from cache. It also enables to identify for LI function what is downloaded for cache and what is uploaded to cache.

Figure 8:
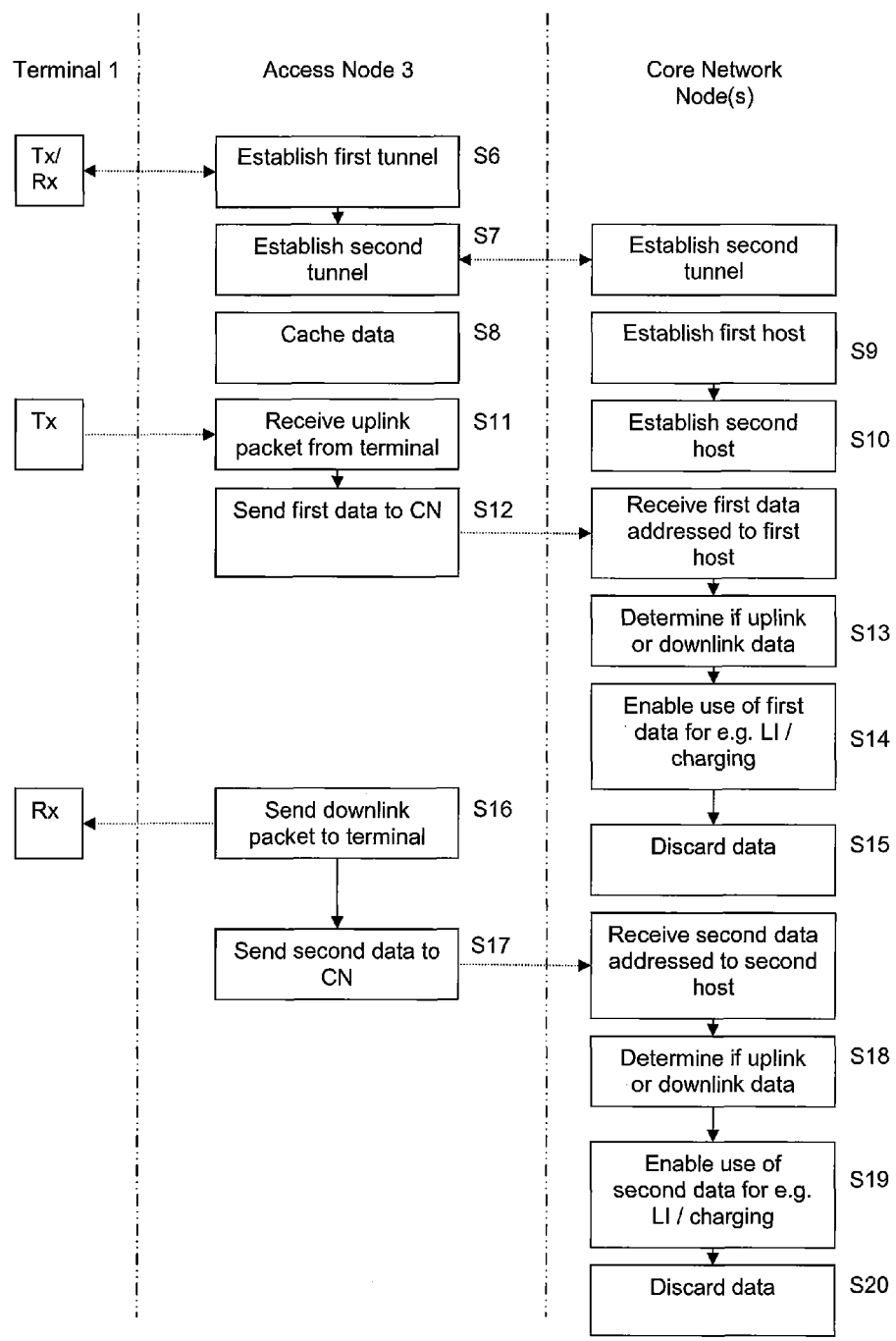
FIG. 8 is a flow chart illustrating steps according to an embodiment.

This is described in more detail in FIG. 8. The following numbering corresponds to that of FIG. 8.

S6. A first GTP tunnel is established between the cache 2 and the terminal 1.

S7. A second GTP tunnel is established between the cache 2 and the CN.

S8. Data is stored at the cache 2.

S9, S10. A first and second host are established in the CN. These allow uplink and downlink data sent between the terminal 1 and the cache 2 to be mirrored at the host.

S11. Uplink data is received at the cache 2 from the terminal 1.

S12. A first data mirroring the uplink data is sent to the CN from the cache 2 addressed to the first host S13. The CN establishes that the first data received at the first host is uplink data.

S14. The CN enables LI/charging/policy control for uplink data received at the first host.

S15. The first data received at the first host may be discarded, as it is no longer required.

S16. The cache 2 sends downlink data to the terminal 1

S17. A second data mirroring the downlink data is sent to the CN from the cache 2, the second data being addressed to the second host.

S18. The CN determines that the second data is downlink data.

S19. The CN enables LI/charging/policy control for downlink data received at the second host.

S20. The second data received at the second host may be discarded, as it is no longer required.

It is to be noted that the arrangement of steps illustrated in FIG. 8 is not intended to imply any particular ordering of those steps. For example, steps S6 and S7 need not necessarily occur before step S8; data can be cached at any time regardless of when the first and second tunnels are established.

The first and second data are provided to the CN in a form or in a manner which allows the CN to distinguish between the first data and the second data, so that the CN is able to treat or process the first data differently from the second data. For example, the first and second data may be sent to first and second different respective hosts in the CN, for example having different respective Internet Protocol (IP) addresses, which hosts may be virtual hosts. The CN is therefore able to distinguish between the first data and the second data based on the destination address of the received data packets.

The first data may comprise copies or duplicates of the packets sent between the cache 2 and the terminal 1 in the first direction. The second data may comprise copies or duplicates of the packets sent between the cache 2 and the terminal 1 in the second direction. Those packets may be discarded in the core network after having been used for, e.g., charging and/or lawful interception, for example after having been replicated or forwarded to a LI and/or charging system in the core network.

Referring back to FIG. 5, in this embodiment, the processor 16 is further arranged to distinguish between uplink and downlink data sent between the cache 2 and the terminal 1, and to forward these to the CN using different IP addresses (addressing routers 21, 23) to allow the CN to distinguish between uplink and downlink data.

Once received at the CN, the first and second data may be copied and sent to a separate function (such as an LI/charging function) where e.g. LI and/or charging can be applied in a manner that differentiates between uplink and downlink (e.g. based on destination address), with the first and second data being forwarded separately to the first and second hosts respectively. The first and second data may be discarded at the first and second hosts. The copied first and second data may also be discarded at the function after having been processed. This copying and forwarding may be performed at a gateway node in the core network. Since no processing as such need be performed at the first and second hosts, forwarding to those hosts need not be performed, and indeed those hosts need not be established at all, as such.

Alternatively, the first and second data may first be forwarded to the first and second hosts respectively, where e.g. LI and/or charging can then be applied in a manner that differentiates between uplink and downlink, either at the hosts or by use of a separate function as above. Once the first and second data has been used for its intended purpose, for example after having been used for LI and/or charging, it may be discarded.

In the core network, therefore, the steps of receiving the first and second data, distinguishing between the first and second data and treating or processing the first data differently from the second data may be performed at a gateway node in the core network such as a serving/packet gateway node. These steps may also or instead be performed at the above-described function that receives the first and second data, such as a LI/charging function, or even at the first and second hosts. The first and second hosts may be established as virtual hosts at the gateway node, or may be physical nodes located remotely from the gateway node. Likewise, the above-described function receiving the first and second data may be located at a node remote from the gateway node, or may be located at the gateway node itself. The discarding step may occur at the remote hosts and/or the remote function rather than at the gateway node, with the gateway node merely forwarding the data on to the appropriate host or function.

Figure 9:
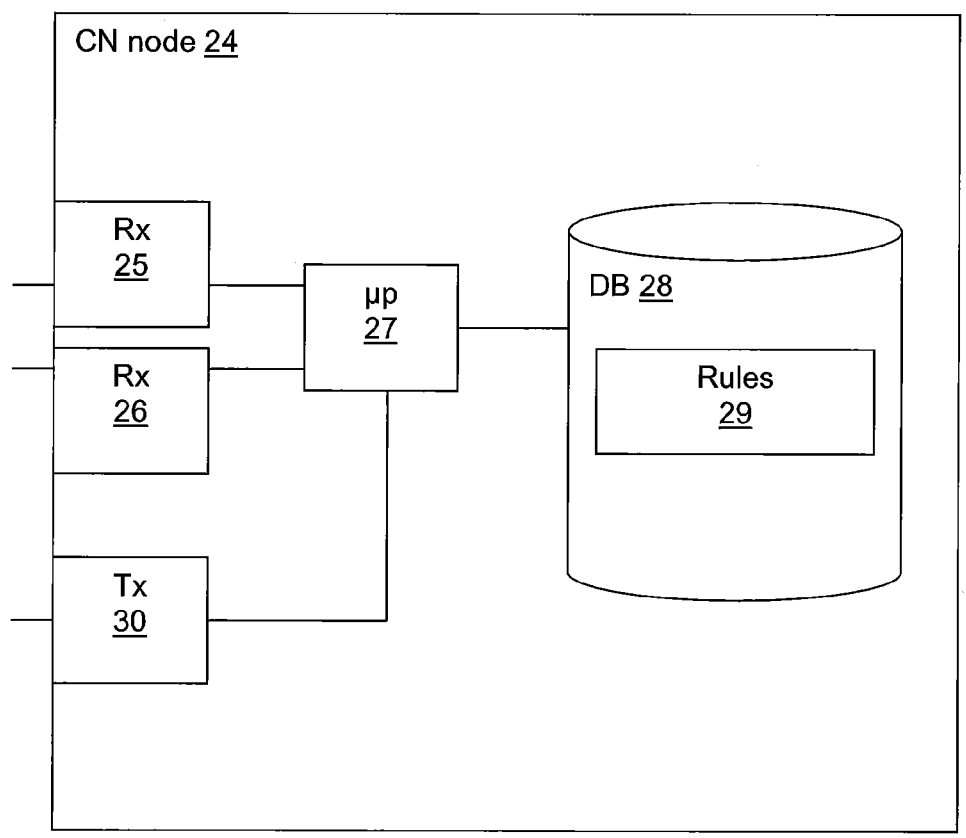
FIG. 9 illustrates schematically in a block diagram a core network node according to an embodiment of the invention.

Referring to FIG. 9 herein, there is illustrated a CN node 24 that receives first and second data. A first receiver 25 and a second receiver 26 are shown for receiving first and second data respectively. It will be appreciated that the first 25 and second receiver 26 may be embodied in a single receiver. A processor 27 applies different rules to the data, depending on whether it is the first or second set of data (corresponding to the uplink or downlink between the terminal 1 and the cache 2). These rules may be obtained from a database 28 containing rules 29. One or more transmitters 30 may be provided for sending the data or information about the data to another function such as an LI/charging function 22. Note that in this example, the node handles reception of both sets of data, but the two data sets may in other embodiments be addressed to virtual hosts located at different nodes in the CN.

It will be appreciated that operation of one or more of the above-described components can be provided in the form of one or more processors or processing units, which processing unit or units could be controlled or provided at least in part by a program operating on the device or apparatus. The function of several depicted components may in fact be performed by a single component. A single processor or processing unit may be arranged to perform the function of multiple components.

The appended diagrams can be considered not only to depict a series of messages exchanged and method steps performed by the various nodes, but also to depict apparatus for exchanging those messages or performing those method steps. In addition, for the sake of completeness, any message which is shown or described as being sent from a node A to a node B implicitly includes the step of node A sending the message as well as the step of node B receiving the message, and means at nodes A and B for performing those steps.

A computer program is also proposed comprising computer readable code for controlling an apparatus to perform a method as herein proposed, or which, when loaded into an apparatus, causes the apparatus to become an apparatus as herein proposed, or which, when run on an apparatus, causes the apparatus to perform a method as proposed above. The program may be carried on a carrier medium. The carrier medium may be a storage medium. The carrier medium may be a transmission medium. An apparatus programmed by such a program is also envisaged, as is a storage medium containing such a program. A computer program product is also proposed comprising a computer readable medium and a computer program as described above, wherein the computer program is stored on the computer readable medium. Such a computer program can be stored on a computer-readable medium, or could, for example, be embodied in a signal such as a downloadable data signal provided from an Internet website. The disclosure is to be interpreted as covering a computer program by itself, or as a record on a carrier, or as a signal, or in any other form.

It is preferred to avoid caching data traffic from, or enable the cache for, roaming users with above solution due to the increase of mirrored traffic in the roaming interface. In the accounting records that are exchanged between operators during roaming, the uplink and downlink volumes are counted separately.

Turning now to policy control solutions, a Policy Control function is about predefined decisions on how to handle service requests and service delivery, for different network- and user behaviours.

The policy control in a mobile network is based on rules defined in the policy control and charging function (PCRF) and is enforced per subscriber identity (e.g. IMSI). When introducing a cache system into the operator's network also a new type of policy control is needed to control the behaviour of the cache, such as handling "black lists" of websites, parental-control to access content, and gating control to stop- or throttle traffic for a given flow.

Parental control is used to block an end-user from receiving certain content, and is currently handled by a CN function. For a RNCC cache solution where the user identity is not known, one solution to check if the parental control is active for a specific URL, the cache control system can generate a "cache miss" (even if requested content are stored in the cache) and then check the HTTP reply coming back from the CN. To verify that parental control rely has been applied a second cache miss could be generated (optional) for the same request and compare the two results. The HTTP response message from the CN may have an operator specific configuration of the HTTP message/string that is detected by the cache as Parental control is applied for the new requested URL. Then for next attempt by the same ongoing GTP tunnel identity (TEID) the cache can direct apply a parental control response.

For hosting of content, policies may be in place for limiting reachability of the end-users to a particular hosted content. Policies for "max-rate" of hosted content may be in place. Issues with end-users policy control and cache 2 in the RNCC 3 include end-user policies requiring knowledge about IP-address/IMSI, which will lead to problems with hosting, and complexity is also introduced with distributed caching solutions.

A cache node policy is, for example, a black-list of URLs and fair usage policies. Such lists must be configured by OaM A fair usage policy is used to give protection for over-usage of network resources. The subscriber may experiencing different actions (e.g. throttling) to limit over-usage (other counters as for charging). The fair usage policy is normally executed in the CN.

One solution to the problem of fair usage in an RNCC cache 2 is to define "Cache node policy" to limiting the served cache "volume/time unit" for a RAB/end-user. The number of requested bytes from the cache 2 for a specific end-user/RAB is counted and if the volume is above the threshold (defined by the policy), the cache 2 will not serve the requests. Variants of the algorithms are:

Fair usage policy is calculated within the RNCC 3; i.e. fair usage by "volume/time unit" for a RAB (implicit an end-user) when user served by this cache instance (node). At the RNCC 3 the RAB is identified by the Bearer ID as defined in 3GPP.

Fair usage policy within an RBS: The algorithm uses the RBS identity defined by e.g. RBS IP address, to compare the usage with other users in the same RBS.

Options on when to activate policy. The policy can be activated or deactivated by OaM, or by automatic mechanisms that calculates the volume per time unit per RBS IP identity and when a predefined threshold is reached the fair usage policy is switched on or switched off when load goes below another threshold. The main advantage is that as long as there is free capacity the operator allows high usage for some few users for a limited time (for example, for download of content when free capacity is available, the transaction will be finalized much faster). The cache 2 control system has the information and can internally decide when above thresholds are reached; based on RBS identity (and/or RNCC instance), and a volume per time unit counter per GTP identifier for the RBS (RBS TEID) to run the algorithm.

Thus, the end-user can not use the cache 2 for unfair over-usage compared to other users (within a Cache- or RBS area). The policy is set by OaM for the cache system.

Gating or access control is a function in the CN that defines if a type of specific traffic is allowed or not. The policy can be a generic policy for the traffic, or if the subscribers traffic quota is used up. The gating works by filter settings in the nodes (PCRF, by OCS or directly in GGSN) either generically or per rating group.

The cache control function can implicitly understand that a flow is subject to gating, by analyzing the ratio between failed download of cache-miss. If failed download is detected for a specific destination, the specific destination is black-listed.

When there is a "cache-miss" in the cache 2 (the requested content is not found in the cache) the requests are forwarded through the CN. The cache 2 can detect the failed downloads response for a request through the CN. The cache 2 can then use it as an indication that the terminal 1 is subjected to gating. The cache 2 can then decide that it will not serve any new requests from the terminal 1. The cache control system can on purpose generate a "cache-miss" to probe the CN based on the operator strategy (based on load, time of day, time intervals).

The cache 2 may also forward another (or several) request (to improve the confidence of the gating) and if those requests also fail, the cache 2 can verify that the connectivity to the origin server has disappeared.

If bandwidth throttling is performed, the cache 2 can detect that by generating consecutive "cache misses" to probe whether the CN is throttling the subscriber's data stream. If throttling is detected (lower throughput then expected for this terminal 1) the cache 2 will continue to forward (generate cache miss) traffic to the CN for this GTP tunnel. Alternatively the cache 2 may decide to throttle the traffic direct from the cache 2. In this case, to stop throttling from the cache 2, the cache 2 generates a further "cache miss" for consecutive packets in the flow to detect if throttling has stopped (detecting higher throughput). However a preferred solution is that all throttling is done in the CN, as the terminal 1 will not generate a lot of traffic if it is throttled in the CN.

If gating/filtering is performed per destination, the cache 2 can "test" the destinations by introducing an additional cache-miss (even if the cache 2 has the content cached). If several failed downloads are detected for the same or different GTP tunnels for a specific destination (i.e. URL), the cache 2 can add the destination to its blacklist or delete the content from its cache, for a specific bearer tunnel (=current user) or for all bearer tunnel (all users). Cache policies are configured by OaM Note that a cache 2 is a network optimization function that gives improved end-user performance experience to access and download content. As such, the operator may want to offer differentiated subscriptions and e.g. offer "cache-as-a-service" for certain subscribers.

Caching may be offered, for example, as a part of subscription, for selected clients such as smart-phones and laptops, or for only non-roaming subscribers. Roaming charging is based on uplink and downlink traffic. A cache 2 may change the counted uplink vs. downlink volume. A potential operator motivation to only apply caching for their own subscribers is to give their own subscribers a better service.

In this case, a new interface is provided between the cache and CN based on in-band signalling between the RNCC 3 and GGSNA/PDN-GW.

An operator specified QoS Class Identifier (QCI)-value for caching i.e. "Best-effort with Caching" is configured as part of the PCC rules and is detected by the cache 2 from the GTP tunnel. The RNCC 3 is also pre-configured with same value. The solution can be made vendor specific or made as a standardized solution.

For roaming users, the cache node option (described above) of "No Caching" may be used. Alternatively, a new cache reporting control signalling over the roaming interface using the 3GPP S8 interface (alternatively signalled over Gn reference with GTP control plane) may be defined, with a new value standardized using the QoS profile to determine that cache service is allowed and can be used if available. For charging, the sum of uplink and downlink traffic within a visited network is counted for that user if they are allowed to use caching when roaming. Note that the solution requires a separate roaming agreement to define how the roaming terminal's traffic is counted.

Of course, a further alternative to providing information from the cache 2 to the CN is to provide no LI and charging interface, and not report to the CN. This solution provides an RNCC 3 having a cache 2 that doesn't do anything with regards to LI and charging/policy control. This solution is acceptable when there are no demands for LI, and works for "flat fee" subscriptions, where there is no requirement on direct gating control of user traffic (e.g. throttling) when monthly bucket is reached; e.g. for ongoing cache payout will continue until next request is received from the user.

The above description provides solutions to put a transparent content cache below the CN inside the radio access network (RBS, RNC or in an aggregation node in the RAN backhaul). An advantage is that the proposed solutions will have little impact on the CN and radio network systems defined in 3GPP. Some of the solution alternatives are also possible to develop as vendor specific solutions or as part of future releases of the 3GPP standard.

The above proposal enables a solution with caching below the CN in the RAN, enabling differentiated charging when sending content to or from a terminal 1, i.e. up- or downlink traffic. The proposal also enables detection of traffic in a LI system if the traffic was sent in up or downlink to or from an operator RAN cache system.

It will be appreciated by the person of skill in the art that various modifications may be made to the above described embodiments without departing from the scope of the present invention as defined in the appended claims. For example, while the description above describes the invention using the example of GTP user plane tunnels, it is applicable to any tunnelling techniques, such as those used in PMIP, L2TP, CMIP and Radio Bearer L2 tunnelling (RLC). Furthermore, the invention may be applied to any type of Access Network node used to access a network that also provides a cache, where information must be reported to the CN for interworking with data provided from the cache. It need not only apply to the case where the access network is a Radio Access Network, but may also find use in networks where the access network is a fixed access network.

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-Ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and sub-combination of these embodiments. Accordingly, the present specification, including the drawings, shall be construed to constitute a complete written description of various example combinations and sub-combinations of embodiments and of the manner and process of making and using them, and shall support claims to any such combination or sub-combination.

The following abbreviations have been used in this specification:
CDR Charging Data Record
DSCP Differentiated Services Code Point
eNB eNodeB
EPS Evolved Packet System
FQDN Fully Qualified Domain Name
GGSN Gateway GPRS Support Node
GTP GPRS Tunnelling Protocol
HLR Home Location Register
HSS Home Subscriber Server
IMSI International Mobile Subscriber Identity
LEA Law Enforcement Agency
LI Lawful Intercept
LTE Long Term Evolution
MSISDN Mobile Subscriber ISDN Number,
MME Mobility Management Entity
MCC Mobile Country Code
MNC Mobile Network Code
OaM Operation and Maintenance system
OCH Offline charging system
PCC Policy and Charging Control
PCRF Policy control and Charging Rule Function
P GW PDN Gateway
PLMN Public Land Mobile Network
QCI QoS Class Identifier
QoS Quality of Service
RAB Radio Bearer
RAN Radio Access Network
RANAP Radio Access Network Application Part (control protocol in Iu-interface)
RBS Radio base station
RLC Radio Bearer L2 tunnelling
RNC Radio Network Controller
RNCC Radio Network- and Cache Controller
S-CDR S-GW reports of Charging Data Records
S-GW Serving Gateway
S1AP 3GPP defined S1 User Plane
SGSN Serving Gateway Supporting Node
SPID Subscriber Profile ID, defined in 3GPP
TTL Time to Live
UE User Equipment

The invention claimed is:

1. A core network node, the core network node comprising:
a first receiver that receives from an access network via a user plane tunnel a first set of data sent to a first host address, the first set of data comprising first information related to data sent from a terminal to a cache in the access network and stored in the cache;
a second receiver that receives a second set of data sent to a second host address, the second set of data comprising second information related to data stored in the cache and that is sent from the cache to the terminal, wherein the first receiver is different from the second receiver; and a processor that operates according to steps defined a rule to handle the first set of data that are different from steps defined by another rule to handle the second set of data.

2. The core network node of claim 1, wherein:
the steps defined by the rule to handle the first set of data comprises operating the processor to perform Lawful Interception on uplink data, and
the steps defined by the rule to handle the second set of data comprises operating the processor to perform Lawful Interception on downlink data.

3. The core network node of claim 2, wherein:
the processor selectively performs the Lawful Interception on uplink data responsive to content of the first information related to data sent from the terminal to the cache in the access network and stored in the cache; and
the processor selectively performs the Lawful Interception on downlink data responsive to content of the second information related to data stored in the cache and that is sent from the cache to the terminal.

4. The core network node of claim 2, wherein:
the steps defined by the rule to handle the first set of data comprises operating the processor to perform the Lawful Interception on uplink data while not performing Lawful Interception on downlink data, and
the steps defined by the rule to handle the second set of data comprises operating the processor to perform Lawful Interception on downlink data while not performing Lawful Interception on uplink data.

5. The core network node of claim 1, wherein:
the steps defined by the rule to handle the first set of data comprises operating the processor to perform operations to charge for services for providing uplink data, and
the steps defined by the rule to handle the second set of data comprises operating the processor to perform operations to charge for providing downlink data.

6. The core network node of claim 5, wherein:
the processor selectively performs the operations to charge for services for providing uplink data responsive to content of the first information related to data sent from the terminal to the cache in the access network and stored in the cache; and
the processor selectively performs the operations to charge for services for providing downlink data responsive to content of the second information related to data stored in the cache and that is sent from the cache to the terminal.

7. The core network node of claim 5, wherein:
the steps defined by the rule to handle the first set of data comprises operating the processor to perform operations to charge for services for providing uplink data while not performing operations to charge for services for providing downlink data, and
the steps defined by the rule to handle the second set of data comprises operating the processor to perform operations to charge for services for providing downlink data while not performing operations to charge for services for providing uplink data.

8. The core network node of claim 1, wherein:
the processor operates to establish a second user-plane tunnel between the cache and the core network through which the first information is received by the core network node relating to data sent from the terminal to the cache in the access network, the second user-plane tunnel is separate from a first user-plane tunnel between the cache and the terminal.

9. The core network node of claim 8, wherein:
the information related to data sent from the terminal to the cache in the access network, contains a URL for service based charging or a report on volume of data sent in the first user plane tunnel for volume based charging, which is processed by the processor.

10. The core network node of claim 9, wherein:
the processor selectively performs operations to charge for services for providing uplink data responsive to the URL for service based charging or to the report on volume of data sent in the first user plane tunnel for volume based charging.

11. The core network node of claim 8, wherein:
the information related to data sent from the terminal to the cache in the access network, contains a copy of all packets sent in the first user plane tunnel via any of the second user plane tunnel and a further user plane tunnel.

12. The core network node of claim 11, wherein:
the processor selectively performs Lawful Interception on uplink data responsive to the copy of all packets sent in the first user plane tunnel via any of the second user plane tunnel and a further user plane tunnel.

13. A method by a core network node, method comprising:
receiving by a first receiver from an access network via a user plane tunnel a first set of data sent to a first host address, the first set of data comprising first information related to data sent from a terminal to a cache in the access network and stored in the cache;
receiving by a second receiver a second set of data sent to a second host address, the second set of data comprising second information related to data stored in the cache and that is sent from the cache to the terminal, wherein the first receiver is different from the second receiver; and
operating a processor according to steps defined a rule to handle the first set of data that are different from steps defined by another rule to handle the second set of data.

14. The method of claim 13, wherein:
the steps defined by the rule to handle the first set of data comprises operating the processor to perform Lawful Interception on uplink data, and
the steps defined by the rule to handle the second set of data comprises operating the processor to perform Lawful Interception on downlink data.

15. The method of claim 14, wherein operating the processor comprises:
selectively performing the Lawful Interception on uplink data responsive to content of the first information related to data sent from the terminal to the cache in the access network and stored in the cache; and
selectively performing the Lawful Interception on downlink data responsive to content of the second information related to data stored in the cache and that is sent from the cache to the terminal.

16. The method of claim 14, wherein:
the steps defined by the rule to handle the first set of data comprises operating the processor to perform the Lawful Interception on uplink data while not performing Lawful Interception on downlink data, and
the steps defined by the rule to handle the second set of data comprises operating the processor to perform Lawful Interception on downlink data while not performing Lawful Interception on uplink data.

17. The method of claim 13, wherein:
the steps defined by the rule to handle the first set of data comprises operating the processor to perform operations to charge for services for providing uplink data, and
the steps defined by the rule to handle the second set of data comprises operating the processor to perform operations to charge for providing downlink data.

18. The method of claim 17, wherein operating the processor comprises:
selectively performing the operations to charge for services for providing uplink data responsive to content of the first information related to data sent from the terminal to the cache in the access network and stored in the cache; and
selectively performing the operations to charge for services for providing downlink data responsive to content of the second information related to data stored in the cache and that is sent from the cache to the terminal.

19. The method of claim 17, wherein:
the steps defined by the rule to handle the first set of data comprises operating the processor to perform operations to charge for services for providing uplink data while not performing operations to charge for services for providing downlink data, and
the steps defined by the rule to handle the second set of data comprises operating the processor to perform operations to charge for services for providing downlink data while not performing operations to charge for services for providing uplink data.

20. The method of claim 13, wherein operating the processor comprises:
establishing a second user-plane tunnel between the cache and the core network through which the first information is received by the core network node relating to data sent from the terminal to the cache in the access network, the second user-plane tunnel is separate from a first user-plane tunnel between the cache and the terminal.

21. The method of claim 20, wherein:
the information related to data sent from the terminal to the cache in the access network, contains a URL for service based charging or a report on volume of data sent in the first user plane tunnel for volume based charging, which is processed by the processor.

22. The method of claim 21, wherein operating the processor comprises:
selectively performing operations to charge for services for providing uplink data responsive to the URL for service based charging or to the report on volume of data sent in the first user plane tunnel for volume based charging.

23. The method of claim 20, wherein:
the information related to data sent from the terminal to the cache in the access network, contains a copy of all packets sent in the first user plane tunnel via any of the second user plane tunnel and a further user plane tunnel.

24. The method of claim 23, wherein operating the processor comprises:
selectively performing Lawful Interception on uplink data responsive to the copy of all packets sent in the first user plane tunnel via any of the second user plane tunnel and a further user plane tunnel.

* * * * *

UNITED STATES PATENT AND TRADEMARK OFFICE
CERTIFICATE OF CORRECTION

PATENT NO. : 9,787,796 B2
APPLICATION NO. : 15/141480
DATED : October 10, 2017
INVENTOR(S) : Eriksson et al.

It is certified that error appears in the above-identified patent and that said Letters Patent is hereby corrected as shown below:

In Column 1, Line 9, delete "2014," and insert -- 2014, now Pat. No. 9,357,581, --, therefor.

In Column 2, Line 65, delete "MSISDN" and insert -- MSISDN. --, therefor.

In Column 6, Line 23, delete "network." and insert -- network; --, therefor.

In Column 6, Line 28, delete "terminal." and insert -- terminal; --, therefor.

In Column 6, Line 44, delete "nothing)" and insert -- nothing). --, therefor.

In Column 6, Line 63, delete "Plane))." and insert -- Plane). --, therefor.

In Column 7, Line 14, delete "LI-function" and insert -- LI-function. --, therefor.

In Column 7, Line 27, delete "RNNC 3" and insert -- RNCC 3 --, therefor.

In Column 8, Line 4, delete "RNNC 3" and insert -- RNCC 3 --, therefor.

In Column 9, Line 43, delete "codes)" and insert -- codes). --, therefor.

In Column 9, Line 44, delete "S1AP" and insert -- S1AP. --, therefor.

In Column 10, Line 12, delete "router/GW's" and insert -- router/GWs --, therefor.

In Column 11, Line 60, delete ""RAN.eNB9876.mnc012.mcc345.pub.3gppnetwork.org"" and insert -- "RAN.eNB9876.mnc012.mcc345.pub.3gppnetwork.org". --, therefor.

In Column 12, Line 7, delete "coming form" and insert -- coming from --, therefor.

Signed and Sealed this
Twenty-second Day of May, 2018

Andrei Iancu
*Director of the United States Patent and Trademark Office*

CERTIFICATE OF CORRECTION (continued)
U.S. Pat. No. 9,787,796 B2

In Column 12, Line 49, delete "FIG. 8." and insert -- FIG. 8: --, therefor.

In Column 12, Line 61, delete "host" and insert -- host. --, therefor.

In Column 13, Line 1, delete "terminal 1" and insert -- terminal 1. --, therefor.

In Column 14, Line 19, delete "first 25" and insert -- first receiver 25 --, therefor.

In Column 17, Line 16, delete "GGSNA/PDN-GW." and insert -- GGSN/PDN-GW. --, therefor.